United States Patent
Martini et al.

(10) Patent No.: US 8,352,108 B2
(45) Date of Patent: Jan. 8, 2013

(54) METHOD AND APPARATUS FOR CONTROLLING MECHANICAL POWER INPUT FROM AN INTERNAL COMBUSTION ENGINE COUPLED TO A HYBRID TRANSMISSION

(75) Inventors: Ryan D. Martini, Wolverine Lake, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 12/748,585

(22) Filed: Mar. 29, 2010

(65) Prior Publication Data

US 2011/0238246 A1   Sep. 29, 2011

(51) Int. Cl.
*B60L 9/00* (2006.01)

(52) U.S. Cl. .......................................... 701/22

(58) Field of Classification Search ................ 701/22
See application file for complete search history.

(56) References Cited

U.S. PATENT DOCUMENTS

| | | | | |
|---|---|---|---|---|
| 6,122,588 | A * | 9/2000 | Shehan et al. | 701/93 |
| 2009/0204280 | A1 * | 8/2009 | Simon et al. | 701/22 |

* cited by examiner

*Primary Examiner* — Thomas Tarcza
*Assistant Examiner* — MacEeh Anwari (57) ABSTRACT

A method for controlling operation of a hybrid powertrain includes monitoring input speed from the engine to the hybrid transmission, calculating an input speed error between the monitored input speed and a preferred input speed, monitoring operating parameters associated with a plurality of torque actuators wherein the torque actuators include the internal combustion engine, the electric torque machine and the output member, selecting one of the torque actuators, and modifying a state of a control parameter associated with the selected one of the torque actuators in response to the input speed error.

19 Claims, 2 Drawing Sheets

METHOD AND APPARATUS FOR CONTROLLING MECHANICAL POWER INPUT FROM AN INTERNAL COMBUSTION ENGINE COUPLED TO A HYBRID TRANSMISSION

TECHNICAL FIELD

This disclosure is related to control systems for internal combustion engines and hybrid powertrain systems.

BACKGROUND

The statements in this section merely provide background information related to the present disclosure and may not constitute prior art.

Known powertrain architectures include torque-generative devices, including internal combustion engines and non-combustion torque machines, e.g., electric machines, which can transmit tractive torque to an output member preferably through a transmission device. One exemplary powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transmitting tractive torque thereto. Electric machines, operative as motors or generators, can be controlled to generate torque inputs to the transmission independently of a torque input from the internal combustion engine. The electric machines may transform vehicle kinetic energy transmitted through the vehicle driveline to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage outputs of the transmission, including torque and rotational speed.

SUMMARY

A hybrid powertrain includes an internal combustion engine configured to transfer mechanical power via a hybrid transmission to a driveline in response to an operator torque request. The hybrid transmission is configured to transfer power among the internal combustion engine, an electric torque machine and an output member of the hybrid transmission. The output member is coupled to the driveline, and the electric torque machine is electrically coupled to an electrical energy storage device. A method for controlling operation of the hybrid powertrain includes monitoring input speed from the engine to the hybrid transmission, calculating an input speed error between the monitored input speed and a preferred input speed, monitoring operating parameters associated with a plurality of torque actuators wherein the torque actuators include the internal combustion engine, the electric torque machine and the output member, selecting one of the torque actuators, and modifying a state of a control parameter associated with the selected one of the torque actuators in response to the input speed error.

BRIEF DESCRIPTION OF THE DRAWINGS

One or more embodiments will now be described, by way of example, with reference to the accompanying drawings, in which.

DETAILED DESCRIPTION

Figure 1:
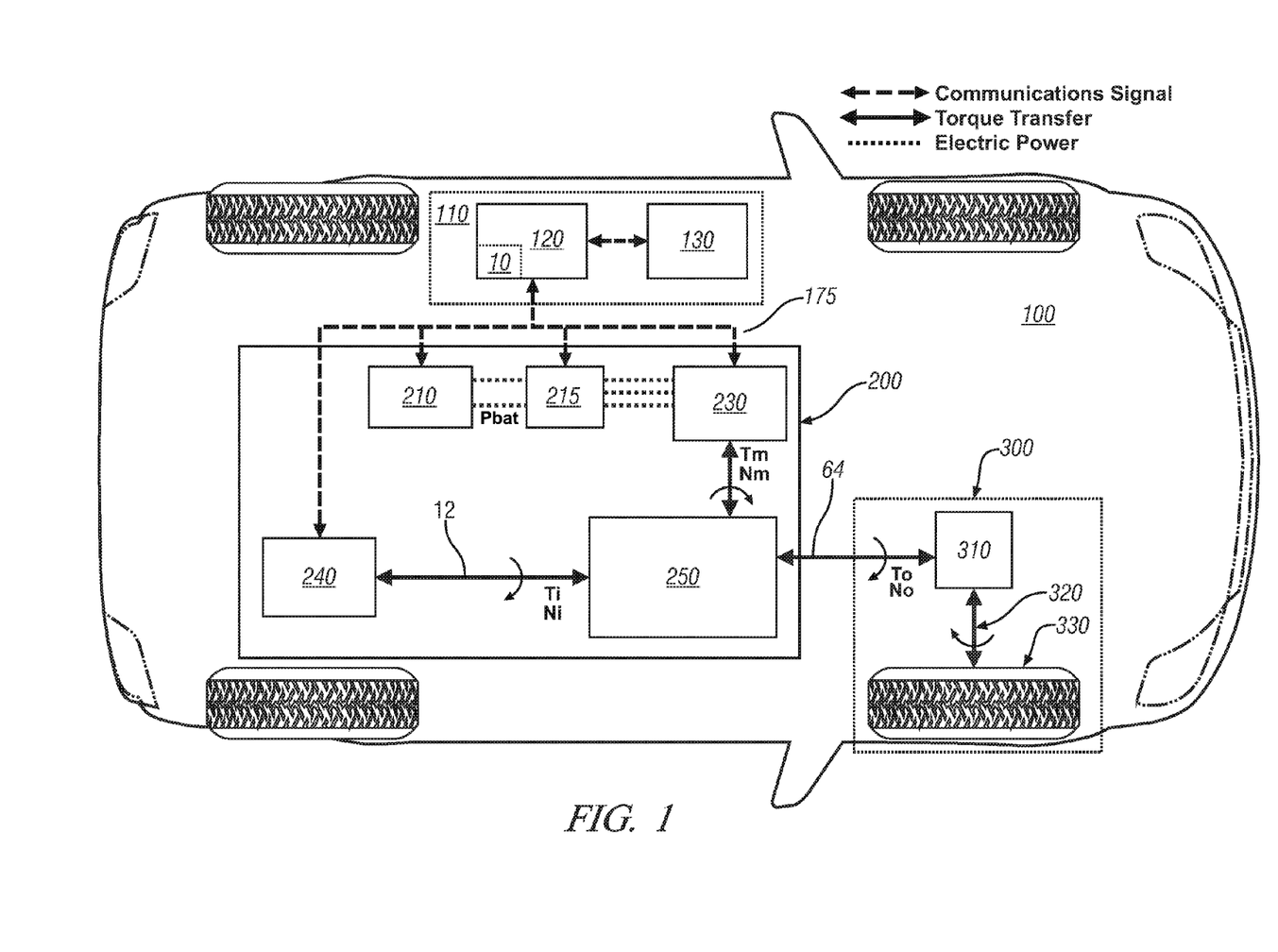
FIG. 1 is a two-dimensional schematic diagram of a vehicle including a hybrid powertrain system having an engine, hybrid transmission, torque machine, and a driveline in accordance with the present disclosure.

Referring now to the drawings, wherein the showings are for the purpose of illustrating certain exemplary embodiments only and not for the purpose of limiting the same, FIG. 1 schematically shows a vehicle 100 including a control system 110, a hybrid powertrain system 200, and a driveline 300. Like numerals refer to like elements in the description.

The driveline 300 can include a differential gear device 310 that mechanically couples to an axle 320 or half-shaft that mechanically couples to a wheel 330 in one embodiment. The differential gear device 310 is coupled to an output member 64 of the hybrid powertrain system 200, and transfers output power therebetween. The driveline 300 transfers tractive power between the hybrid powertrain system 200 and a road surface.

The hybrid powertrain system 200 includes an internal combustion engine 240, hereafter referred to as engine 240, and torque machine(s) 230 that are mechanically coupled to a hybrid transmission 250. It is appreciated that the hybrid powertrain system 200 may be configured as any one of a series hybrid powertrain, a parallel hybrid powertrain, and a compound hybrid powertrain.

When the hybrid powertrain system 200 is in a parallel configuration, mechanical power originating in the engine 240 can be transferred via an input member 12 to the output member 64 using the hybrid transmission 250. When the hybrid powertrain system 200 is in a compound configuration, mechanical power originating in the engine 240 can be transferred via the input member 12 to either or both the output member 64 and the torque machine(s) 230 using the hybrid transmission 250. When the hybrid powertrain system 200 is in a series configuration, mechanical power originating in the engine 240 can be transferred via the input member 12 to one of the torque machine(s) 230 using the hybrid transmission 250. Operating parameters associated with such input power from the engine 240 include input torque Ti and input speed Ni. Mechanical power from the torque machine(s) 230 can be transferred to the output member 64 and the engine 240 using the hybrid transmission 250. Control parameters associated with such mechanical power transfer include motor torque Tm and motor speed Nm. Mechanical power can be transferred between the hybrid transmission 250 and the driveline 300 via the output member 64. Parameters associated with such mechanical power transfer include output torque To and output speed No.

Preferably, the engine 240 is a multi-cylinder internal combustion engine selectively operative in a plurality of states, including one of an engine-on state and an engine-off state, one of an all-cylinder state and a cylinder deactivation state, and one of a fueled state and a fuel cutoff state. In one embodiment, the hybrid transmission 250 is operative in one of a plurality of range states including fixed gear and continuously variable range states through selective activation of one or more torque transfer clutches. In one embodiment, the engine 240 is a spark-ignition engine with timing of combustion and associated engine torque being controlled by advancing or retarding spark ignition timing. Alternatively, the engine 240 is a compression-ignition engine with timing of combustion and the associated engine torque controlled by advancing or retarding timing of fuel injection events. It is appreciated that there is a preferred combustion timing associated with engine operation corresponding to a best fuel efficiency point for an engine operating point. In one embodiment this best fuel efficiency point is referred to as a mean-best torque (MBT) point.

The hybrid transmission 250 can be configured and controlled to transfer mechanical power therethrough using one or more differential gear sets and selective activation of one or more torque transfer devices, e.g., clutches, in one embodiment. It is appreciated that the configuration of the hybrid transmission 250 corresponds to the hybrid powertrain configuration, i.e., one of a series, parallel, and compound hybrid configuration.

It is appreciated that the torque machine(s) 230, the engine 240 and the hybrid transmission 250 each include a plurality of sensing devices for monitoring operation thereof including rotational position sensors, e.g., resolvers, for monitoring rotational position and speed of each of the torque machine(s) 230. It is further appreciated that the torque machine(s) 230, engine 240 and hybrid transmission 250 each include a plurality of actuators for controlling operation thereof.

An electric energy storage device, e.g., a high-voltage battery (HV Batt) 210 stores potential electric energy and is electrically coupled via an inverter (IM) 215 to the torque machine(s) 230 to transfer electric power therebetween. It is appreciated that the high-voltage battery 210 is an electric energy storage device that can include a plurality of electrical cells, ultracapacitors, and other devices configured to store electric energy on-vehicle.

The torque machine(s) 230 preferably includes multiphase electric motor/generators configured to convert stored electric energy to mechanical power and convert mechanical power to electric energy that can be stored in the high-voltage battery 210. The engine 240 converts fuel stored in a fuel tank to mechanical power through a combustion process.

The control system 110 includes a control module 120 that is signally connected to an operator interface 130. The control module 120 includes a low-voltage electric power supply to provide regulated electric power thereto. It is appreciated that there are a plurality of human/machine interface devices through which the vehicle operator commands operation of the vehicle 100, including, e.g., an ignition switch, an accelerator pedal, a brake pedal, and a transmission range selector (PRNDL). Although the control module 120 and operator interface 130 are shown as discrete elements, such an illustration is for ease of description. It should be recognized that the functions described as being performed by the control module 120 may be combined into one or more devices, e.g., implemented in software, hardware, and/or application-specific integrated circuitry (ASIC) and ancillary circuits that are separate and distinct from the control module 120. Control module, module, controller, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 120 has a set of control algorithms, including resident program instructions and calibrations stored in one of the storage mediums and executed to provide respective functions. It is appreciated that information transfer to and from the control module 120 can be accomplished using one or more communications paths, e.g., communications bus 175, which can include one or more of a direct connection, a local area network bus, and a serial peripheral interface bus. The algorithms of the control schemes are executed during preset loop cycles such that each algorithm is executed at least once each loop cycle. Algorithms stored in the non-volatile memory devices are periodically executed to monitor inputs from the sensing devices and execute control and diagnostic routines to control operation of actuators associated with elements of the hybrid powertrain system 200 using calibrations. Alternatively, algorithms may be executed in response to the occurrence of an event.

The control module 120 preferably signally and operatively connects to individual elements of the hybrid powertrain system 200 via the communications bus 175. The control module 120 signally connects to the sensing devices of each of the high-voltage battery 210, torque machine(s) 230, engine 240, and the hybrid transmission 250 to monitor operation and determine parametric states thereof. Monitored parametric states of the engine 240 preferably include input speed (Ni), input torque (Ti) or load, and temperature. Monitored parametric states of the hybrid transmission 250 preferably include rotational speed, and hydraulic pressure at a plurality of locations, from which parametric states including application of specific torque transfer clutches can be determined Monitored parametric states of the torque machine(s) 230 preferably include speed(s) (Nm) and power flow(s), e.g., electric current flow, from which a parametric state for motor torque(s) (Tm) output from the torque machine(s) 230 can be determined Monitored operating parameters of the high-voltage battery 210 include battery power (Pbat).

The control module 120 operatively connects to the actuators of each of the torque machine(s) 230, the engine 240, and the hybrid transmission 250 to control operation thereof in accordance with executed control schemes that are stored in the form of algorithms and calibrations. The actuators associated with the torque machine(s) 230 preferably include inverter(s) 215. It is appreciated that the inverter(s) 215 transforms electric power in a manner suitable for generating torque and storing electric power, depending upon operating conditions. It is further appreciated that the control module 120 controls the inverter(s) 215 to control electric power flow between the high-voltage battery 210 and the torque machine (s) 230, including electric current flow that discharges the high-voltage battery 210 to generate tractive power in the torque machine(s) 230 and using torque input to the torque machine(s) 230 to generate electric current flow to charge the high-voltage battery 210. The torque input to the torque machine(s) 230 to generate electric current flow to charge the high-voltage battery 210 can include input torque Ti from the engine 240 and regenerative braking torque from the driveline 300. Actuators associated with the engine 240 preferably include, e.g., fuel injectors, air flow controllers, spark ignition systems, and other devices associated with controlling engine operation to control the aforementioned engine states. This includes controlling engine operation to achieve a mean-best torque (MBT) point, as previously described. This includes controlling timing of combustion and corresponding torque output from the engine 240 by advancing or retarding spark ignition timing. Alternatively, this includes controlling timing of combustion and corresponding torque output from the engine 240 by advancing or retarding timing of fuel injection events. Actuators associated with the hybrid transmission 250 include, e.g., solenoid devices for actuating torque transfer clutches to effect operation of the transmission in specific range states including, e.g., fixed gear states and electrically variable mode states.

The control module 120 includes a control scheme 10 for controlling a system speed by controlling operation of torque actuators of the hybrid powertrain 200. In one embodiment, controlling the system speed includes controlling input speed Ni from the engine 240 to the hybrid transmission 250. In one embodiment, the torque actuators include the internal combustion engine 240, the torque machine(s) 230 and the output member 64 to the driveline 300. It is appreciated that the torque actuators of the hybrid powertrain 200 may be controlled in response to another system speed, e.g., a clutch speed. It is appreciated that other, different torque actuators can be included in the control scheme 10.

The control scheme 10 includes calculating a speed error, e.g., an input speed error (Ni-err), which is an difference between the monitored input speed and a preferred input speed from the engine 240 to the hybrid transmission 250.

The control scheme 10 controls operation of the hybrid powertrain system 200 in one of a plurality of operating states. Executing each of the operating states includes modifying control of a selected one of the torque actuators in response to the input speed error and concurrently maintaining operation of the other torque actuators. The control scheme 10 selects one of the torque actuators for the modified control responsive to the input speed error according to a control hierarchy. The control hierarchy includes a process to select one of a plurality of operating states, with each operating state associated with controlling a single one of the torque actuators whereby a state(s) of a single (or plural) control parameter(s) associated with the selected torque actuator is modified in response to incremental changes in the input speed as indicated by the input speed error. Control parameters associated with the other, non-selected torque actuators can be modified in response to other inputs, but are not modified in response to the input speed error.

The selection of a preferred operating state and an associated single one of the torque actuators for modified control responsive to the input speed error according to the predetermined control hierarchy is dependent upon states of the operating parameters associated with the torque actuators. This includes the control scheme 10 shifting control away from a presently selected one of the torque actuators and modifying control of another one of the torque actuators only when an operating parameter associated with the presently selected one of the torque actuators achieves a predetermined limit, or when a control parameter associated with the presently selected one of the torque actuators saturates. This preferably occurs when the difference between the input speed (Ni) and the preferred input speed (Ni Dsrd) (hereafter preferred input speed (Ni Dsrd)) from the engine 240 to the hybrid transmission 250 remains greater than zero. Control is executed in each of the operating states such that the difference between the input speed (Ni) and the preferred input speed (Ni Dsrd) is reduced to zero.

In a first of the operating states, the engine 240 is controlled to a preferred operating point to generate mechanical power responsive to the operator torque request. Coincidently, the torque machine(s) 230 is the selected one of the torque actuators having a control parameter, e.g., motor electric current that is modified responsive to the input speed error. The preferred operating parameter associated with operation of the torque machine(s) 230 is battery power (Pbat). The control scheme 10 operates the hybrid powertrain 200 in the first operating state as long as the operating parameter, i.e., battery power is within allowable power limits and has not achieved one of the saturation limits, and other powertrain limits, including, e.g., battery power and other hybrid transmission system constraints are not exceeded. Such operation in the first operating state allows recapture of any produced engine power that is in excess of that required for propulsion. Any one of the aforementioned powertrain limits may be employed to constrain the electrical system's ability to control the input speed, and cause the control scheme to shift from the first operating state to a second of the operating states.

The control scheme 10 shifts from the first operating state to the second operating state only when one of the operating parameters, e.g., battery power achieves one of the saturation limits. It is appreciated that the control scheme 10 may also shift from the first operating state to the second operating state when other hybrid powertrain constraints or limits are exceeded, including, e.g., motor torque limits and clutch torque limits. Any of these can constrain the electrical system's ability to control engine speed and thus control the input speed error.

The second operating state includes the engine 240 as the selected one of the torque actuators having a control parameter that is modified responsive to the input speed error. The preferred operating parameter associated with operation of the engine 240 is input torque Ti. One engine control parameter associated with rapid control of the input torque includes engine spark control, e.g., spark advance. It is appreciated that the engine control parameter can include other engine control parameters associated with fast-responding effects on the input torque, e.g., fuel injection timing. A minimum state for the engine control parameter is a minimum allowable state that still achieves stable combustion. A preferred state for the engine control parameter is a state for the engine control parameter that is associated with optimum operation of the engine, e.g., a state for the control parameter that achieves a maximum thermal efficiency point for the engine 240 corresponding to the operator torque request, which can be a mean-best torque (MBT) point in one embodiment. The preferred and minimum states for the engine control parameter define the saturation limits for control of the hybrid powertrain 200 in the second operating state, and correspondingly define the saturation limits of the operating parameter, i.e., the input torque Ti. As long as the controlled state of the engine control parameter does not achieve one of the saturation limits, the control scheme 10 operates the hybrid powertrain 200 in the second operating state, with the first operating state remaining saturated. The control scheme 10 shifts to operate the hybrid powertrain 200 in the first operating state when the engine control parameter achieves the preferred state for the engine control parameter. The control scheme 10 shifts to operate the hybrid powertrain 200 in a third of the operating states when the engine control parameter achieves the minimum state for the engine control parameter. It is appreciated that there is hysteresis in shifting between the first, second and third operating states.

The third operating state includes the output member 64 to the driveline 300 as the selected one of the torque actuators having a control parameter that is modified responsive to the input speed error. The preferred operating parameter associated with the output member 64 to the driveline 300 includes the output torque To. A preferred state for the output torque is equal to the operator torque request. As long as the output torque exceeds the operator torque request, the control scheme 200 operates the hybrid powertrain 200 in the third operating state, with the first and second operating states remaining saturated. It is appreciated that there are adjustments in the operation in the third operating state associated with dynamic changes in the operator torque request. The control scheme 200 shifts away from operating in the third operating state to operate the hybrid powertrain 200 in the second operating state when the output torque is equal to the operator torque request. It is appreciated that there is hysteresis in shifting between the second and third operating states.

Thus, the control scheme 10 controls the hybrid powertrain 200 in a selected one of the first, second, and third operating states to modify an operating parameter associated with one of the torque actuators responsive to the input speed error. Such control is executed in a hierarchical fashion depending upon states of the operating parameters and states of control parameters associated with the torque actuators. The control scheme 10 coordinates overall operation of the hybrid powertrain system 200 to manage transfer of mechanical power to the driveline 300 in response to the operator torque request and to manage electric power flow to the high-voltage battery 210.

The control hierarchy of the control scheme 10 is used to control operation of the engine 240. A highest priority in the control hierarchy for controlling mechanical power input from the engine 240 is controlling and operating the powertrain 200 such that the engine 240 does not stall or overspeed when the engine 240 is in the engine-on state. A secondary priority in the control hierarchy for controlling mechanical power input from the engine 240 is operating the powertrain 200 such that battery power limits associated with the high-voltage battery 210 are not violated, i.e., the battery power is maintained within the allowable range between the minimum and maximum allowable battery power, and neither exceeds maximum battery power associated with discharging nor falls below minimum battery power associated with charging. A tertiary priority in the control hierarchy for controlling mechanical power input from the engine 240 is operating the powertrain 200 such that the output torque to the driveline 300 is responsive to and meeting the operator torque request commanded through the operator interface 130. Furthermore, it is appreciated that controlling the input speed in the first operating state to generate and store additional electric power is more efficient and advantageous than controlling the input speed in the second operating state using spark retard, which consumes fuel without an accompanying torque generation.

The control scheme 10 controls the hybrid powertrain 200 in a selected one of the first, second, and third operating states to modify an operating parameter of one of the torque actuators responsive to the input speed error and in response to the operator torque request. In one embodiment, the input speed error (Ni Err) is a difference between actual input speed (Ni Act) and a preferred input speed (Ni Dsrd), e.g., under conditions when there is an uncontrolled driveline torque disturbance such as a traction control event.

Figure 2:
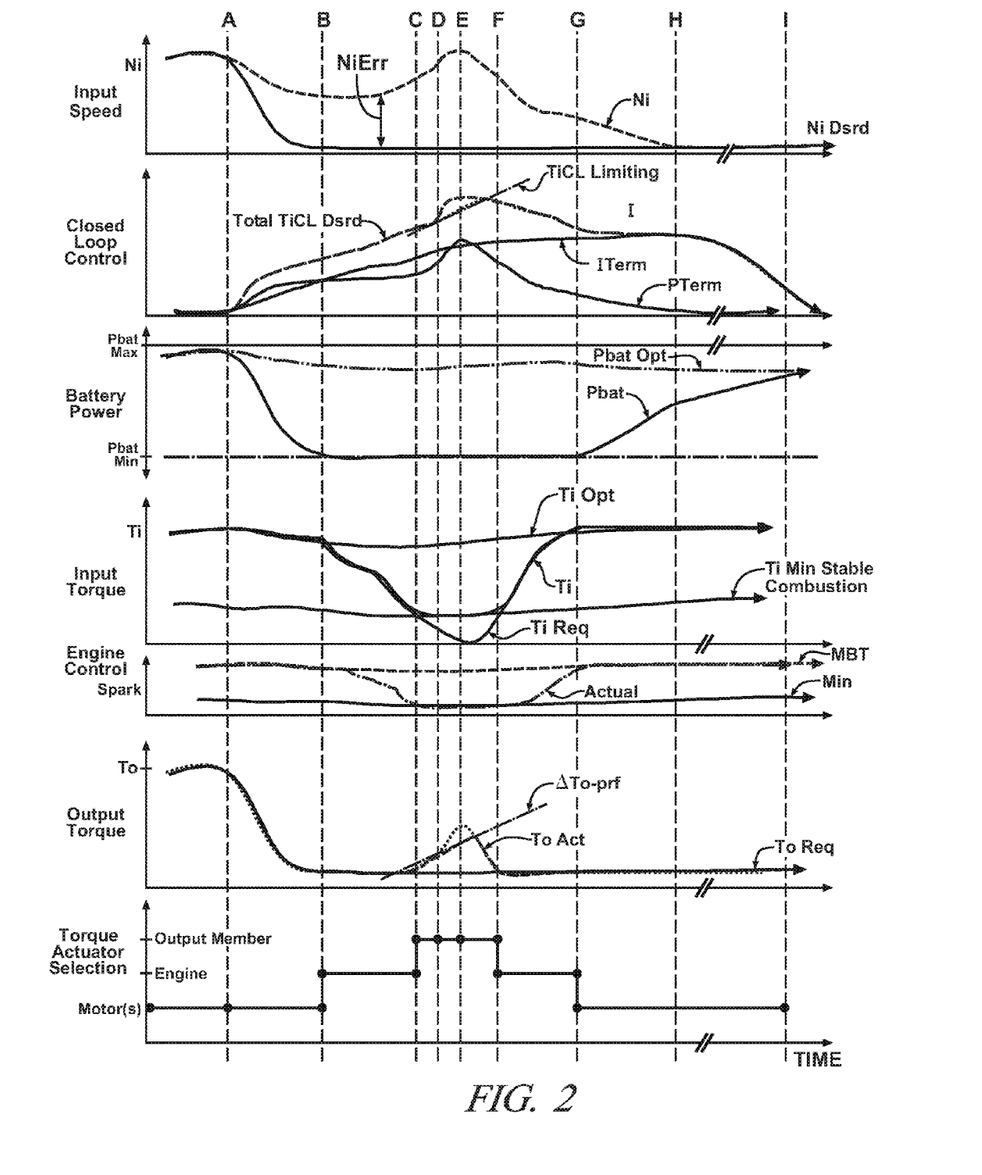
FIG. 2 is a graphical depiction of time-based operation of an exemplary hybrid powertrain system associated with execution of a hierarchy for controlling mechanical power input from the engine in accordance with the present disclosure.

FIG. 2 graphically depicts time-based operation of an exemplary hybrid powertrain system, including executing the control hierarchy of the control scheme 10 to center operation of the hybrid powertrain system in one of a plurality of operating states with associated operating parameters and control parameters, e.g., as described with reference to FIG. 1. Operation of the hybrid powertrain 200 includes selecting one of the operating states and modifying control of the associated torque actuator to control input speed Ni from the engine 240 to the hybrid transmission 250 in response to the input speed error (Ni Err) at any given point in time, as described herein. The torque actuators include the engine 240, the torque machine(s) 230, and the output torque To to the driveline 300 in one embodiment.

The graph of FIG. 2 depicts coincidently occurring parametric states associated with Input Speed, Closed-Loop Control, Battery Power, Input Torque, Engine Control, Output Torque, and Actuator Selection.

The Input Speed graph includes measured input speed (Ni) and a preferred input speed (Ni Dsrd) from the engine 240 to the hybrid transmission 250. It is appreciated the preferred input speed (Ni Dsrd) is a preferred or desired time-based projection for the input speed (Ni) associated with achieving a maximum system efficiency, which preferably includes a maximum engine thermal efficiency and managing overall system operation of the hybrid powertrain system 200 in response to the operator torque request.

The Closed-Loop Control graph includes a closed-loop control signal (Total TiCL Dsrd) that is responsive to a difference between actual input speed (Ni) and a preferred input speed (Ni Dsrd) from the engine 240 to the hybrid transmission 250. A limiting term (TiCL Limiting) depicts a limit in the time-rate change of the closed-loop control signal. The closed-loop control signal includes a proportional term (PTerm) and an integral term (ITerm). The closed-loop control signal can be generated using a known PI controller in response to the difference between actual input speed (Ni) and the preferred input speed (Ni Dsrd). As is appreciated, the closed-loop control signal can be deconstructed into the proportional term (PTerm) and the integral term (ITerm) for control purposes.

The Battery Power graph includes actual battery power (Pbat), a preferred battery power (Pbat Opt), and a battery power range described in terms of saturation limits including a maximum battery power associated with discharging (Pbat Max) and a minimum battery power associated with charging (Pbat Min). The high voltage battery 210 is controlled in relation to the actual battery power which is preferably within the allowable range between the minimum and maximum allowable battery power. It is appreciated that the battery power is measured in terms of a parameter that can be regularly monitored, e.g., state of charge (SOC), which is a measure of available electric power, or another suitable control parameter. The saturation limits associated with battery power are preferably established to prevent either overcharging or overdischarging of the high voltage battery 210, which can result in damage that reduces service life thereof. It is appreciated that the use of battery power as a control parameter is meant to be illustrative, and another powertrain control parameter may be used to similar effect, including, e.g., clutch torque constraints.

The Input Torque graph includes actual input torque (Ti), a preferred input torque (Ti Opt), an input torque request (Ti Req), and a low power saturation limit, which is minimum input torque associated with stable combustion (Ti Min Stable Combustion).

The Engine Control graph includes actual and preferred states for an engine control parameter associated with rapid control of the input torque (Ti) from the engine 240. As depicted, the actual and preferred states for an engine control parameter associated with rapid control of the input torque include control terms related to engine spark control (Spark-Act and Spark-MBT, respectively). A minimum state for the engine control parameter (Spark-Min) is shown, and is associated with a minimum allowable state of the engine control parameter that still achieves stable combustion.

The Output Torque graph includes an operator torque request (To Req) and an actual output torque (To Act). The Actuator Selection graph indicates which one of the powertrain actuators has one or more control parameters that is presently being modified by the control scheme in response to the difference between the measured input speed (Ni) and a preferred input speed (Ni Dsrd) from the engine 240 to the hybrid transmission 250. The Actuator Selection graph indicates a selected one of the engine 240 (Engine), the torque machine(s) 230 (Motor(s)), and the output member 64 (Output Member).

During ongoing operation (e.g., prior to Point A) the hybrid powertrain system 200 is controlled in response to the operator torque request, with input power from the engine 240 controlled such that the input speed error (Ni Err) is zero, i.e., the actual input speed (Ni) tracks the preferred input speed (Ni Dsrd) with the torque machine(s) 230 controlled in response to the input speed error (Ni Err). The actual state of the engine control parameter (Spark-Act) is controlled to match the preferred state (Spark-MBT). As such, the torque machine(s) 230 is the selected one of the torque actuators, and control parameters associated with the torque machine(s) 230 are modified in response to the closed-loop control signal (Total TiCL Dsrd) to control the input speed (Ni) to match the preferred input speed (Ni Dsrd).

Point A depicts a beginning of occurrence of an event wherein the actual input speed (Ni) diverges from the preferred input speed (Ni Dsrd). Such an event can include a traction control event. The closed-loop control signal (Total TiCL Dsrd) is responsive to the input speed error (Ni Err), including errors that result from additional, unanticipated torque input from the input member 12 to the hybrid transmission 250. The operation of the torque machine(s) 230 is modified responsive to the closed-loop control signal (Total TiCL Dsrd) to react excess input torque to try to recover and adjust the input speed (Ni). The reacted input torque transforms to electric power that charges the high voltage battery 210. The engine 240 is controlled to operate at the preferred engine operating point, i.e., the Engine Control controls the actual state of the engine control parameter (Spark-Act) to match the preferred state (Spark-MBT). As such, the torque machine(s) 230 continues to be the selected one of the torque actuators that is controlled in response to the closed-loop control signal (Total TiCL Dsrd) to reduce the input speed error (Ni Err), i.e., to control the input speed (Ni) to match the preferred input speed (Ni Dsrd). The actual output torque (To Act) continues to match the operator torque request (To Req). Thus, an incremental change in the input speed error (Ni Err) is handled by modifying the torque output of the torque machine(s) 230.

The high voltage battery 210 may saturate, as indicated at Point B by achieving a maximum power level, i.e., a charge limit. This may include a condition wherein torque output of the torque machine(s) 230 is saturated. The actual input speed (Ni) may continue to diverge from the preferred input speed (Ni Dsrd), as shown. At Point B the input speed error (Ni Err) and the associated closed-loop control signal (Total TiCL Dsrd) may continue to indicate that a correction is needed to regain control of the input speed (Ni). In such conditions, additional modifications may need to be made to control to the hybrid powertrain 200 to dissipate torque input from the engine 240 in order to reduce the input speed error (Ni Err). At this point, the control scheme discontinues modifying operation of the torque machine(s) 230 in response to the closed-loop control signal (Total TiCL Dsrd) to react the input torque (Ti) to try to recover and adjust the input speed (Ni). Operation of the torque machine(s) 230 continues in the saturated state. Instead, the control scheme modifies operation of the engine 240 responsive to the closed-loop control signal (Total TiCL Dsrd) to achieve the preferred input speed (Ni Dsrd). Operation of the engine 240 is modified to operate away from the preferred engine operating point, i.e., the Engine Control controls the actual state of the engine control parameter (Spark-Act) between the preferred state (Spark-MBT) and the minimum allowable state of the engine control parameter that still achieves stable combustion (Spark-Min). As such, the engine 240 is the selected one of the torque actuators that is controlled in response to the closed-loop control signal (Total TiCL Dsrd) to control the input speed (Ni) to match the preferred input speed (Ni Dsrd). The actual output torque (To Act) continues to match the operator torque request (To Req). Thus, an incremental change in the input speed error (Ni Err) is handled by modifying the torque output of the engine 240.

The Engine Control may saturate, as indicated at Point C by achieving the minimum allowable state of the engine control parameter that still achieves stable combustion (Spark-Min) with the high voltage battery 210 also being saturated at its maximum power level (Pbat Max). The actual input speed (Ni) may continue to diverge from the preferred input speed (Ni Dsrd). At Point C the input speed error (Ni Err) and the closed-loop control signal (Total TiCL Dsrd) can continue to indicate that a correction is needed to regain control of the input speed (Ni). In such a condition, additional control needs to be applied to the hybrid powertrain 200 to dissipate torque input from the engine 240 in order to reduce the input speed error (Ni Err). At this point, the control scheme discontinues any additional modifying control of either the engine 240 or the torque machine(s) 230 in response to the closed-loop control signal (Total TiCL Dsrd) to react the extra input torque to try to recover and adjust the input speed (Ni). Instead, the control scheme modifies the actual output torque (To Act) in response to the closed-loop control signal (Total TiCL Dsrd) to achieve the preferred input speed (Ni Dsrd) if possible. This operating scenario may not be achievable when the transmission range selector is in a Neutral condition. The engine 240 continues to operate away from the preferred engine operating point, i.e., the Engine Control controls the actual state of the engine control parameter (Spark-Act) at the minimum allowable state of the engine control parameter that still achieves stable combustion (Spark-Min). As such, the output torque to the output member 64 (Output Member) is the selected one of the torque actuators that is controlled in response to the closed-loop control signal (Total TiCL Dsrd) to control the input speed (Ni) to match the preferred input speed (Ni Dsrd). The actual output torque (To Act) diverges from the operator torque request (To Req) to control the input speed (Ni) to match the preferred input speed (Ni Dsrd). Thus, an incremental change in the input speed error (Ni Err) is handled by modifying the output torque to the output member 64.

Point D indicates a point in operation whereat the actual input speed (Ni) continues to diverge from the preferred input speed (Ni Dsrd) at an increasing rate. The Engine Control is saturated, as indicated at Point C by achieving the minimum allowable state of the engine control parameter that still achieves stable combustion (Spark-Min) with the high voltage battery 210 also being saturated at its maximum power level (Pbat Max). At Point D the input speed error (Ni Err) and the closed-loop control signal (Total TiCL Dsrd) continue to indicate that a larger correction is needed to regain control of the input speed (Ni). In such a condition, additional control needs to be applied to the hybrid powertrain 200 to dissipate torque input from the engine 240 in order to reduce the input speed error (Ni Err). The control scheme continues to discontinue additional modifying control of either the engine 240 or the torque machine(s) 230 in response to the closed-loop control signal (Total TiCL Dsrd) to react the extra input torque to try to recover and adjust the input speed (Ni). The control scheme modifies the output torque (To Act) to allow an increase in the output torque to the output member 64 (Output Member) as the selected one of the torque actuators and controlled at a maximum allowed rate of change in the output torque (ΔTo-prf). This maximum allowed rate of change in the output torque (ΔTo-prf) is controlled such that it is not discernible to the vehicle operator and is significantly reduced from disturbance which would have resulted if no limit was applied. The engine 240 continues to operate away from the preferred engine operating point, i.e., the Engine Control controls the actual state of the engine control parameter (Spark-Act) at the minimum allowable state of the engine control parameter that still achieves stable combustion (Spark-Min). As such, the output torque to the output member 64 (Output Member) and more specifically the maximum allowed rate of change in the output torque (ΔTo-prf) is the selected one of the torque actuators that is controlled in response to the closed-loop control signal (Total TiCL Dsrd) to control the input speed (Ni) to match the preferred input speed (Ni Dsrd). The actual output torque (To Act) diverges from the operator torque request (To Req) to control the input speed (Ni) to match the preferred input speed (Ni Dsrd). Thus, an incremental change in the input speed error (Ni Err) is handled by modifying the output torque at a controlled rate of change.

Point E indicates a point in operation whereat the actual input speed (Ni) may begin to converge with the preferred input speed (Ni Dsrd). At Point E the input speed error (Ni Err) and the closed-loop control signal (Total TiCL Dsrd) can indicate that a correction of lesser magnitude is needed to regain control of the input speed (Ni). In such a condition, control needs to be applied to the hybrid powertrain 200 to dissipate torque input from the engine 240 in order to reduce the input speed error (Ni Err). At this point, the control scheme continues to modify the actual output torque (To Act) in response to the closed-loop control signal (Total TiCL Dsrd) to achieve the preferred input speed (Ni Dsrd). The engine 240 continues to operate away from the preferred engine operating point, i.e., the Engine Control controls the actual state of the engine control parameter (Spark-Act) away from the preferred state (Spark-MBT) and at the minimum allowable state of the engine control parameter that still achieves stable combustion (Spark-Min). The high voltage battery 210 continues to operate in a saturated state at its maximum power level (Pbat Max). The output torque to the output member 64 continues to be the selected one of the torque actuators that is controlled in response to the closed-loop control signal (Total TiCL Dsrd) to control the input speed (Ni) to match the preferred input speed (Ni Dsrd). The actual output torque (To Act) converges toward the operator torque request (To Req) to control the input speed (Ni) to match the preferred input speed (Ni Dsrd).

Point F indicates a point in operation whereat the actual input speed (Ni) continues to converge with the preferred input speed (Ni Dsrd). At Point F the actual output torque (To Act) converges with the operator torque request (To Req), and thus the control authority associated with the output torque (To) is no longer necessary. The input speed error (Ni Err) and the closed-loop control signal (Total TiCL Dsrd) indicate that a correction of lesser magnitude is needed to regain control of the input speed (Ni). Control continues to need to be applied to the hybrid powertrain 200 to dissipate torque input from the engine 240 in order to reduce the input speed error (Ni Err). The control scheme modifies operation of the engine 240 responsive to the closed-loop control signal (Total TiCL Dsrd) to achieve the preferred input speed (Ni Dsrd). Operation of the engine 240 is modified to operate away from the preferred engine operating point, i.e., the Engine Control controls the actual state of the engine control parameter (Spark-Act) between the preferred state (Spark-MBT) and the minimum allowable state of the engine control parameter that still achieves stable combustion (Spark-Min). The high voltage battery 210 continues to operate in a saturated state at its maximum power level (Pbat Max). As such, the engine 240 is the selected one of the torque actuators that is controlled in response to the closed-loop control signal (Total TiCL Dsrd) to control the input speed (Ni) to match the preferred input speed (Ni Dsrd). The actual output torque (To Act) nearly matches the operator torque request (To Req).

Point G indicates a point in operation whereat the actual input speed (Ni) continues to converge with the preferred input speed (Ni Dsrd). At Point G, the input speed error (Ni Err) and the closed-loop control signal (Total TiCL Dsrd) continue to indicate that a correction is needed to regain control of the input speed (Ni). However, the Engine Control has achieved a control point at which the actual state of the engine control parameter (Spark-Act) matches the preferred state (Spark-MBT), and thus the engine has reached a saturation point. Control continues to need to be applied to the hybrid powertrain 200 to dissipate torque input from the engine 240 in order to reduce the input speed error (Ni Err). The engine 240 is controlled to operate at the preferred engine operating point, i.e., the Engine Control controls the actual state of the engine control parameter (Spark-Act) to match the preferred state (Spark-MBT).

The control scheme switches the operating state such that operation of the torque machine(s) 230 is modified responsive to the closed-loop control signal (Total TiCL Dsrd) to react excess input torque to try to recover and adjust the input speed (Ni). As such, the torque machine(s) 230 is the selected one of the torque actuators that is controlled in response to the closed-loop control signal (Total TiCL Dsrd) to reduce the input speed error (Ni Err), i.e., to control the input speed (Ni) to match the preferred input speed (Ni Dsrd). The actual output torque (To Act) continues to match the operator torque request (To Req). The reacted input torque transforms to electric power that charges the high voltage battery 210.

Point H indicates a point in operation whereat the actual input speed (Ni) converges, i.e., the actual input speed (Ni) tracks the preferred input speed (Ni Dsrd) with input power from the engine 240 controlled such that the input speed error (Ni Err) is zero. The Engine Control has achieved a control point at which the actual state of the engine control parameter (Spark-Act) matches the preferred state (Spark-MBT). The proportional term (Pterm) of the closed-loop control signal stabilizes, but the integral term (Iterm) and thus the closed-loop control signal (Total TiCL Dsrd) continues to indicate that a correction is needed, such correction associated with a difference between the battery power (Pbat) and the preferred battery power (Pbat Opt). As such, the torque machine(s) 230 is the selected one of the torque actuators, and control parameters associated with the torque machine(s) 230 are modified in response to the closed-loop control signal (Total TiCL Dsrd) to control the input speed (Ni) to match the preferred input speed (Ni Dsrd). The actual output torque (To Act) continues to match the operator torque request (To Req).

Point I indicates a point in operation subsequent to the actual input speed (Ni) converging, i.e., the actual input speed (Ni) tracks the preferred input speed (Ni Dsrd) with input power from the engine 240 controlled such that the input speed error (Ni Err) is zero. The Engine Control has achieved a control point at which the actual state of the engine control parameter (Spark-Act) matches the preferred state (Spark-MBT). The proportional term (Pterm) and the integral term (Iterm) of the closed-loop control signal are converging to stable values as the battery power (Pbat) converges with the preferred battery power (Pbat Opt). As such, the torque machine(s) 230 continues as the selected one of the torque actuators, and control parameters associated with the torque machine(s) 230 are modified in response to the closed-loop control signal (Total TiCL Dsrd) to control the input speed (Ni) to match the preferred input speed (Ni Dsrd). The actual output torque (To Act) continues to match the operator torque request (To Req).

The aforementioned control scheme 10 includes modifying control of a selected one of the torque actuators including the engine 240, the torque machine(s) 230, and the output torque (To) in response to a difference between the input speed (Ni) and the preferred input speed (Ni Dsrd).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling operation of a hybrid powertrain including an internal combustion engine configured to transfer mechanical power via a hybrid transmission to a driveline in response to an operator torque request, the hybrid transmission configured to transfer power among the internal combustion engine, an electric torque machine and an output member of the hybrid transmission, the output member coupled to the driveline, the electric torque machine electrically coupled to an electrical energy storage device, wherein a processor performs the method comprising:

monitoring input speed from the engine to the hybrid transmission;

calculating an input speed error between the monitored input speed and a preferred input speed;

monitoring operating parameters associated with a plurality of torque actuators, the torque actuators including the internal combustion engine, the electric torque machine and the output member;

selecting one of the torque actuators; and modifying a state of a control parameter associated with the selected one of the torque actuators in response to the input speed error, said modifying comprising only modifying the state of the control parameter associated with the selected one of the torque actuators in response to the input speed error and not modifying states of control parameters associated with non-selected ones of the torque actuators in response to the input speed error.

2. The method of claim 1, wherein selecting one of the torque actuators comprises selecting the electric torque machine when an operating parameter associated with the electrical energy storage device is within allowable limits.

3. The method of claim 2, wherein modifying the state of the control parameter associated with the selected one of the torque actuators in response to the input speed error comprises modifying electric current flow between the electric torque machine and the electrical energy storage device in response to the input speed error.

4. The method of claim 1, wherein selecting one of the torque actuators comprises selecting the internal combustion engine only when an operating parameter associated with the electrical energy storage device exceeds an allowable limit.

5. The method of claim 4, wherein selecting the internal combustion engine only when an operating parameter associated with the electrical energy storage device exceeds an allowable limit comprises selecting the internal combustion engine when torque output from the electric torque machine is saturated.

6. The method of claim 4, wherein modifying the state of the control parameter associated with the selected one of the torque actuators in response to the input speed error, the selected one of the torque actuators comprising the internal combustion engine, comprises modifying an engine control parameter associated with a fast-responding effect on input torque from the engine in response to the input speed error.

7. The method of claim 6, wherein modifying the engine control parameter associated with a fast-responding effect on input torque from the engine in response to the input speed error comprises modifying engine spark control in response to the input speed error.

8. The method of claim 6, wherein modifying the engine control parameter associated with a fast-responding effect on input torque from the engine in response to the input speed error comprises modifying engine fuel injection timing in response to the input speed error.

9. The method of claim 6, wherein modifying the state of the control parameter associated with the selected one of the torque actuators in response to the input speed error comprises only modifying the engine control parameter associated with the fast-responding effect on input torque from the engine in response to the input speed error and not modifying states of control parameters associated with the electric torque machine and the output member in response to the input speed error.

10. The method of claim 1, wherein selecting one of the torque actuators comprises selecting the output member only when an operating parameter associated with the internal combustion engine exceeds an allowable limit.

11. The method of claim 1, wherein selecting one of the torque actuators comprises selecting the output member only when an operating parameter associated with the internal combustion engine exceeds a respective allowable limit and an operating parameter associated with the electrical energy storage device exceeds a respective allowable limit.

12. The method of claim 11, wherein selecting the output member only when the operating parameter associated with the internal combustion engine exceeds the respective allowable limit and the operating parameter associated with the electrical energy storage device exceeds the respective allowable limit includes selecting the output member only when torque output from the electric torque machine is saturated.

13. The method of claim 11, wherein selecting the output member only when the operating parameter associated with the internal combustion engine exceeds the respective allowable limit comprises selecting the output member only when a state of an operating parameter associated with the internal combustion engine exceeds an allowable limit associated with stable combustion.

14. The method of claim 11, wherein modifying the state of the control parameter associated with the selected one of the torque actuators in response to the input speed error comprises modifying output torque from the output member in response to the input speed error.

15. Method for controlling operation of a hybrid powertrain to transfer mechanical power to a driveline in response to an operator torque request, wherein a processor performs the method comprising:

monitoring an engine input speed;

calculating an input speed error between the monitored engine input speed and a preferred engine input speed;

monitoring operating parameters associated with a plurality of torque actuators operative to transfer torque to an output member of the hybrid powertrain;

executing a control hierarchy to select one of a plurality of operating states; and modifying a state of a control parameter for a selected one of the torque actuators associated with the selected one of the operating states in response to the input speed error when the monitored input speed diverges from the preferred input speed in response to an uncontrolled driveline torque disturbance, said modifying comprising only modifying the state of the control parameter associated with the selected one of the torque actuators in response to the input speed error and not modifying states of control parameters associated with non-selected ones of the torque actuators in response to the input speed error.

16. The method of claim 15, wherein modifying the state of the control parameter for one of the torque actuators associated with the selected one of the operating states in response to the input speed error comprises modifying a control state of an electric torque machine when an operating parameter associated with an associated electrical energy storage device is within a respective allowable limit.

17. The method of claim 16, wherein modifying the state of the control parameter for one of the torque actuators associated with the selected one of the operating states in response to the input speed error further comprises modifying a control state of the internal combustion engine only when the operating parameter associated with the associated electrical energy storage device exceeds the respective allowable limit.

18. The method of claim 17, wherein modifying the control state of the internal combustion engine only when the operating parameter associated with the associated electrical energy storage device exceeds the respective allowable limit comprises modifying the control state of the internal combustion engine only when torque output from the electric torque machine is saturated and the operating parameter associated with the associated electrical energy storage device exceeds the respective allowable limit.

19. Method for controlling operation of a hybrid powertrain, wherein a processor performs the method comprising:

monitoring input speed from an engine to a hybrid transmission;

calculating an input speed error between the monitored input speed and a preferred input speed;

monitoring states of operating parameters associated with a plurality of torque actuators, the torque actuators including the internal combustion engine, an electric torque machine coupled to the hybrid transmission, and an output member of the hybrid transmission;

executing a control hierarchy to select one of a plurality of operating states, wherein each operating state is associated with controlling a single one of the torque actuators; and modifying a state of a control parameter associated with the selected operating state in response to the input speed error when the monitored input speed diverges from the preferred input speed in response to an uncontrolled driveline torque disturbance, said modifying comprising only modifying the state of the control parameter associated with the selected operating state in response to the input speed error and not modifying states of control parameters associated with non-selected operating states in response to the input speed error.

* * * * *